United States Patent [19]

Schaefer et al.

[11] Patent Number: 4,581,261
[45] Date of Patent: Apr. 8, 1986

[54] DRESSED SPLIT LEATHER

[75] Inventors: Helmut Schaefer, Mercogliano, Italy; Philipp Schaefer, Hanover, Fed. Rep. of Germany

[73] Assignee: Microplastic Rop., Bella Vista, Panama

[21] Appl. No.: 577,154

[22] Filed: Feb. 6, 1984

[30] Foreign Application Priority Data

Aug. 4, 1983 [EP] European Pat. Off. ........ 83890127.0

[51] Int. Cl.$^4$ ............................................. B32B 27/12
[52] U.S. Cl. ..................................... 428/15; 428/151; 428/308.4; 428/323; 428/332; 428/423.4; 428/521; 428/522; 428/540
[58] Field of Search ................ 428/151, 15, 904, 521, 428/540, 522, 332, 323, 16, 423.4, 308.4

[56] References Cited

U.S. PATENT DOCUMENTS

| 3,565,981 | 2/1971 | Lauro | 428/151 |
| 3,864,181 | 2/1975 | Wolinski et al. | 428/904 |
| 3,871,938 | 3/1975 | Takahashi et al. | 428/904 |
| 4,002,792 | 1/1977 | Peterson et al. | 428/904 |
| 4,132,821 | 1/1979 | Hiers et al. | 428/151 |

Primary Examiner—Paul J. Thibodeau
Attorney, Agent, or Firm—Karl F. Ross; Herbert Dubno

[57] ABSTRACT

A dressed leather comprises a split leather having one side from which fibers protrude, a first layer of a solidified aqueous dispersion having a thickness between 0.07 mm and 0.22 mm of a synthetic plastics material in which the fibers are completely immersed on the one side, a second layer of a synthetic plastics material of generally the same thickness as the first layer bonded to the first layer and having turned away therefrom a textured surface, and a finish layer overlying the textured surface of the second layer. The split leather is substantially free of the dispersion except at the fibers.

13 Claims, 7 Drawing Figures

DRESSED SPLIT LEATHER

FIELD OF THE INVENTION

The invention relates to a dressed substrate such as leather, in particular split leather, having fibers protruding from at least one side of the substrate, or in the case of unsplit leather from both sides of the substrate. By means of dressing, the leather or the like shall be provided with a coating on its side in view, which coating has a nice appearance like leather, i.e. has the grain structure of leather or the velour structure of leather. This allows leather of minor quality, in particular split, to be used, for example for producing shoes, thereby achieving, on the one hand, a nice appearance and fully maintaining, on the other hand, the properties of leather including its adsorbency, suppleness and strength. The invention further relates to a process for dressing such a substrate as well as an apparatus for producing such a dressing with such a substrate.

BACKGROUND OF THE INVENTION

It is already known to upgrade split or leather hides having an injured surface by applying a coating in the form of a prefabricated film of synthetic plastic material. For this purpose, an adhesive is applied to the split, whereupon the film is placed thereon and glued to the split with a heated press. In this connection it is known to arrange within the press an embossing metal sheet for giving the film of synthetic plastics material during pressing a grain structure. For this purpose the film must be softened and the temperatures prevailing within the press are thus substantially elevated temperatures of approximately 170° C. Under the influence of these temperatures as well as under the influence of the compressing forces exerted within the press, the leather is strongly affected and is strengthened in an undesired manner.

It has also been proposed to use a high frequency plate press equipped with a mold of silicone rubber for glueing the film of synthetic plastics material to the split. The leather coated with an adhesive and having the film arranged thereon are, in this case, put into the cold mold of silicone rubber, whereupon high frequency heating is effected. Because the leather always containing moisture, the leather is also heated by the high frequency field and the above-mentioned drawbacks are thus not overcome.

Additionally, there is already known a process for dressing split in which the coating to be bonded to the split is formed from a polyurethane dispersion having incorporated therein hollow microspheres or compact particles containing an inflating agent and forming hollow microspheres when heat is applied to them, the shells of the hollow microspheres being filled with a gas and preferably consisting of a vinylidene chloride copolymer. The aqueous dispersion of a polyurethane is, in this case, applied either directly onto the leather to be coated or onto a removable supporting surface noting that in the latter case the leather is placed on top of a layer of a polyurethane dispersion. The polyurethane dispersion is then allowed to solidify and any supporting surface is removed. With this known process, drying of the polyurethane dispersion applied onto the leather can be effected, for example, by means of a vacuum drying means, the water being removed through the layer of leather. Such known vacuum drying means are devices of the type used in the wet stage of tanneries for drying the leather from the still dripping wet condition after the tanning process. The leather in a dripping wet condition is arranged between a heated steel plate forming a support base and a felt-like porous sheet material is pressed against the leather, the steam formed being sucked through the felt-like porous sheet material under the action of vacuum.

It is also known to provide a carrier layer with a cover layer of synthetic plastics material having hollow microspheres embedded therein.

OBJECTS OF THE INVENTION

It is an object of the present invention to provide a dressed substrate, in particular a dressed leather, in which the dressing becomes intimately and inseparably connected with the substrate.

It is a further object of the invention to provide a dressed substrate, in particular a dressed leather, in which disturbing inclusions of gas or air between the substrate and the dressing are reliably prevented. It is a further object of the present invention to provide a dressed substrate, in particular a dressed leather, in which the properties of the substrate or leather, respectively, are not changed in a disadvantageous manner upon application of the dressing and, in particular, the softness and suppleness of the leather is not adversely affected. It is a further object of the invention to provide a dressed substrate, in particular a dressed of leather having a nice appearance like that leather at its surface facing the viewer. It is a further object of the invention to provide a dressing having a long life and a durable surface which resists damage except under severe stress.

It is a further object of the invention to provide a process and an apparatus which allows dressing of the substrate in a simple manner and with simple equipment, thereby ensuring an unobjectional bond between the substrate and the dressing and reliably avoiding disturbing air bubbles and air inclusions between the dressing and the substrate.

BRIEF DESCRIPTION OF THE DRAWING

The annexed drawing illustrate an apparatus according to the invention, working to the process according which is also explained with reference to the drawing. In the drawing.

SPECIFIC DESCRIPTION

Figure 1:
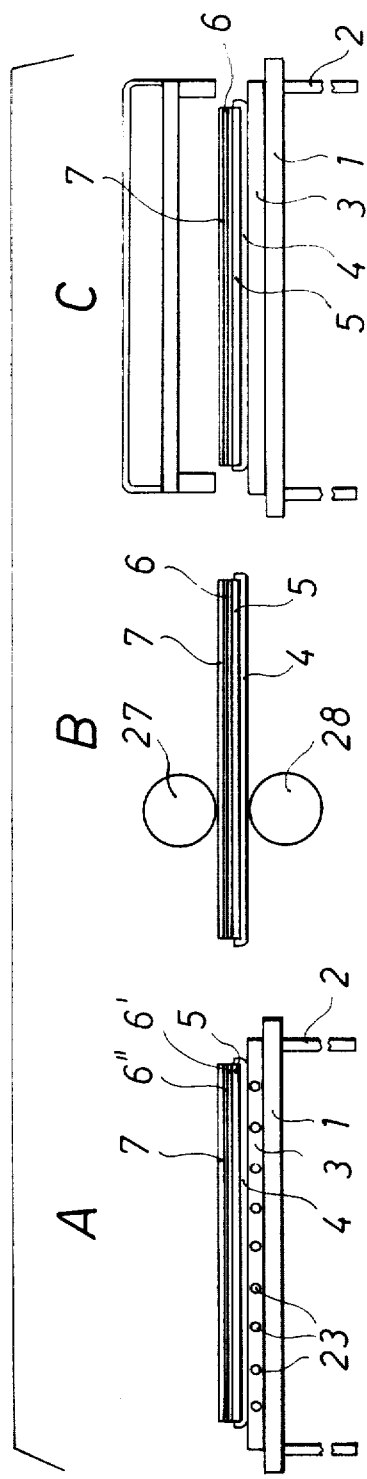
FIG. 1 is a side elevational view illustrating three parts of an apparatus for carrying out the method of the invention.
Figure 2:
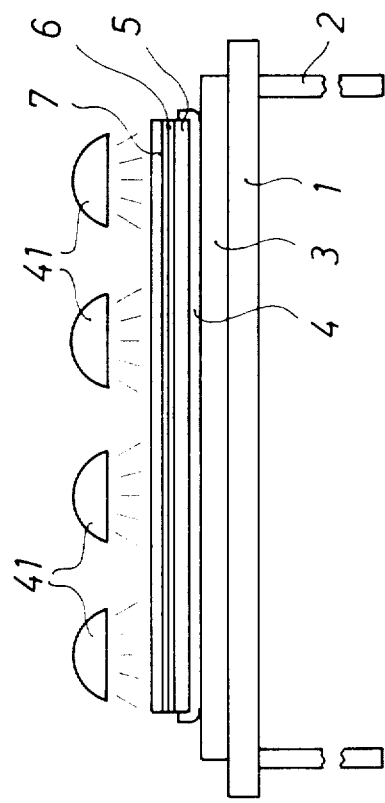
FIG. 2 shows another aspect of the apparatus in elevation.
Figures 3, 7:
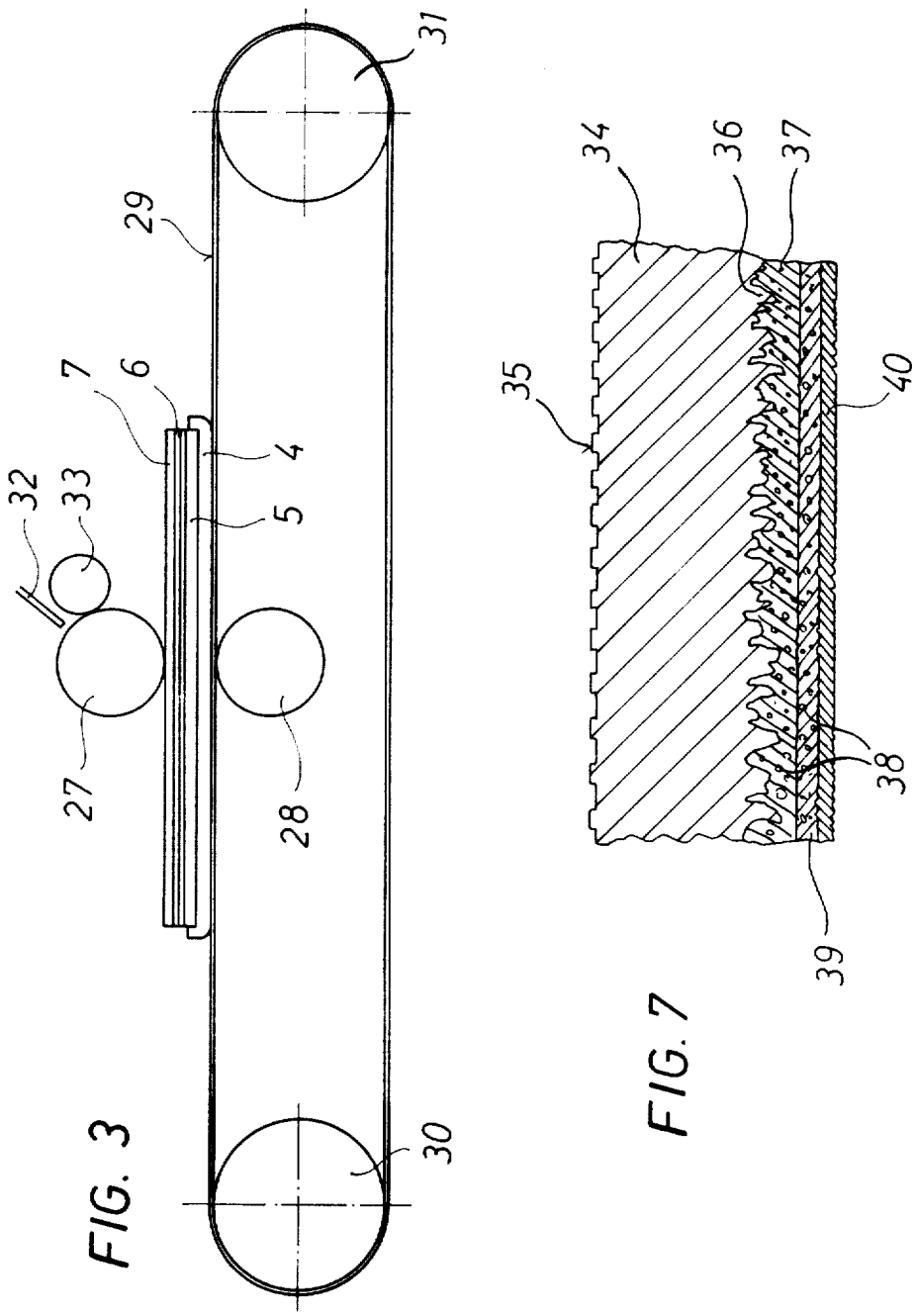
FIG. 3 represents in diagrammatic side elevation another embodiment.
FIG. 7 is a section through the dressed leather.

FIG. 1 schematically shows an apparatus according to the invention composed of three components, i.e. a component for applying the dispersion of synthetic plastics materials, a roller press and a vacuum device while FIG. 2 shows a modified embodiment of the component for applying the dispersions of synthetic plastics material. FIG. 3 shows in a side elevation an embodiment of a roller press according to the invention, and FIG. 4 shows a section through a first embodiment of a vacuum device according to the invention, FIG. 5 is a partial top plan view of the vacuum device in direction of the arrow V in FIG. 4, FIG. 6 shows a second embodiment of the vacuum device according to the invention in a section, and FIG. 7 shows in a section and in a substantially enlarged scale a dressed split.

Figure 4:
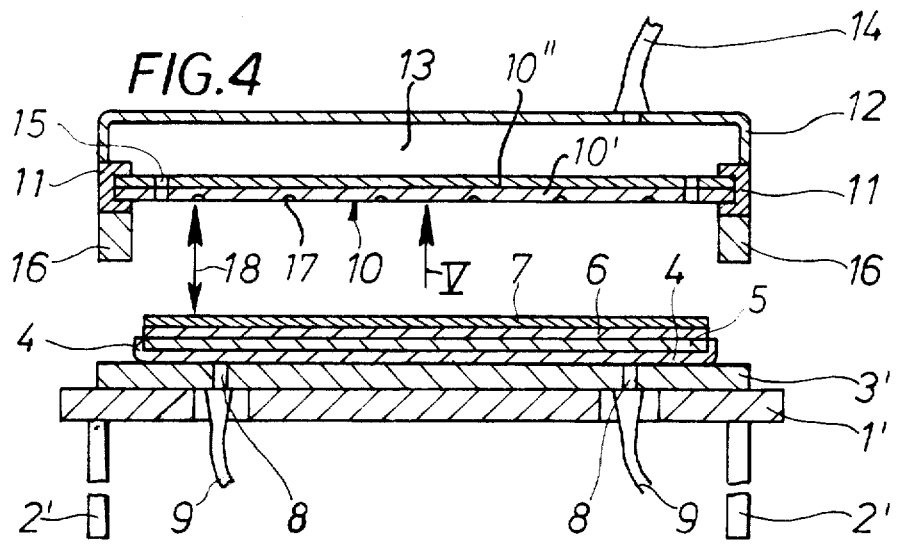
FIG. 4 is a section through a press according to the invention.
Figure 5:
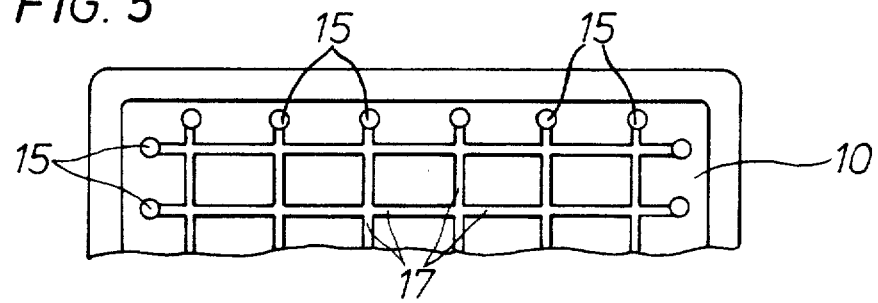
FIG. 5 is a partial plan view of a portion of a plate of the press.
Figure 6:
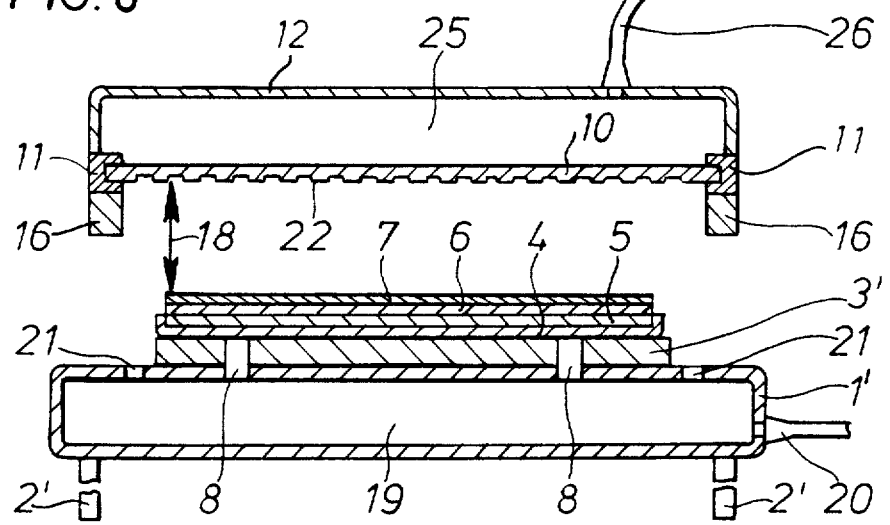
FIG. 6 is a view similar to FIG. 4 of another embodiment.

As can be deduced from FIG. 1, the device according to the invention consists of a station or component A for applying the dispersion of synthetic plastics material, of a station or component B, i.e. a roller dresser, and of a station or component C, i.e. the vacuum device (see FIGS. 4-6).

The component A has a table 1 resting on feet 2. A heated metallic plate 3 is arranged on the table 1. Heating of the plate is, for example, effected by means of electric heating wires 23 embedded within the plate. A rigid supporting member 4 of, for example, aluminum sheet, rests on the heated plate and supports a flexible supporting member 5, preferably of silicone rubber, having anti-adhesive properties. The supporting member 5 has a structural shape at its upper surface, i.e. a surface showing small recesses, depressions or the like, which is transmitted to the dressing, so that the upper surface of the dressing has then a leather-like appearance.

A first aqueous dispersion of synthetic plastics material is first applied onto the supporting member 5, prefeably having been already heated, in an amount to form from this dispersion of synthetic plastics material a cohesive layer 6' having a thickness within the range from 0.07 to 0.22 mm. This dispersion of synthetic plastics material is allowed to solidify with formation of the mentioned layer 6', which can be accelerated by means of the electric heating wires 23. Subsequently, a second aqueous dispersion of synthetic plastics material is applied to the solidified layer 6' in an amount approximately corresponding to the amount of the first dispersion of synthetic plastics material, whereupon the split is placed on this still wet layer of the dispersion of synthetic plastics material. This second aqueous dispersion of synthetic plastics material forms—after having been solidified—the layer 6", the split being designated by 7. Both layers 6', 6" form together the dressing 6.

It is also possible to apply the second aqueous dispersion of synthetic plastics material onto the split 7 and to place the thus treated split with its side having applied thereon the second aqueous dispersion of synthetic plastics material upon the solidified first dispersion of synthetic plastics material.

The rigid supporting member 4, the flexible supporting member 5, the dressing 6 consisting of both layers 6', 6" and the split 7 are subsequently compressed one with the other within a roller press B comprising at least two rollers 27, 28. Compressing is, however, performed such that a minor amount of the dispersion of synthetic plastics material forming the second layer 6" is laterally expelled, thereby making sure that the fibres of the split 7 are at all areas immersed in the second aqueous dispersion of synthetic plastics material and become anchored within this second dispersion of synthetic plastics material after solidification of this second dispersion.

The roller press shown in FIG. 3 on a larger scale differs from the roller press B shown in FIG. 1 insofar as an endless conveyor belt 29 running over transport rollers 30, 31 is passed between both rollers 27, 28. A water supply means 32 as well as a cleaning roller 33 is additionally provided. A water-operated cleaning device is thus formed for cleaning the roller 27.

The rigid supporting member 4 together with the flexible supporting member 5 supporting the dressing 6 and the split 7 are placed on the endless conveyor belt 29. These parts are then passed between the rollers 27, 28, thus compressing the dressing 6 and the split 7 into another and expelling any included air. The roller 27 consists of elastic material so it can compensate for any differences in thickness. It is, however, also sufficient if only the surface of the roll 27 consists of elastic material. For the same reason at least one of the two rollers 27, 28 can be resiliently supported with bearings, i.e. be moved in a direction perpendicular to the transport direction of the conveyor belt 29 against the force of a spring. Of course, a plurality of roller pairs can also be arranged one behind the other for assuring a better compressing action.

The embodiment according to FIG. 2 differs from the embodiment of the component A in FIG. 1 insofar as the heated metallic plate 3 is replaced by infrared radiators 41 or equipment generating a high-frequency field, which means equally effect heating and thus drying of the applied dispersions of synthetic plastics material.

An embodiment of the vacuum device C is shown in detail in the FIGS. 4 and 5. The vacuum device shown there has a table 1' supported with legs 2' and having arranged thereon a rigid, heated metallic plate 3'. Heating of this plate 3' is, for example, again effected by means of electric heating wires embedded within this plate. Heating can, however, also be effected in any other suitable manner. The rigid supporting member 4 rests together with the flexible supporting member 5 of silicone rubber on the heated plate 3'. The dressing 6 as well as the split 7 is located on the supporting member 5. The rigid supporting member 4 is removably arranged on the heated plate 3', so that the rigid supporting member 4 can, together with the flexible supporting member 5, the dressing 6 and the split 7, be placed upon the heated plate 3' after havin passed in common through the roller press B. The rigid supporting member 4 is then maintained in position on the heated plate 3' under the action of vacuum. For this purpose, openings 8 are provided in the heated plate and connected via hoses 9 with known means, not shown, for generated a vacuum.

Opposite, the metallic plate 3', there is provided a countersurface consisting of a diaphragm 10 clamped within a frame 11. The diaphragm 10 preferably consists of two layers 10', 10", the lower layer 10' being formed of a rubber optionally reinforced by insert members, preferably of silicone rubber. A cover 12 is provided above the frame 11 and encloses in cooperation with the diaphragm 10 a space 13 connected via a hose 14 with the means for generating a vacuum. Openings 15 in connection with the space 13 are provided at the ede portion of the diaphragm 10. An elastically compressible seal 16 preferably equally consisting of silicone rubber is provided on the bottom surface of the frame 11.

The bottom side 10' of the diaphragm 10 is, at its surface opposite the rigid plate 3', provided with grooves 17 arranged according to the pattern of a grid and extending to the openings 15, so that a generated vapor can escape via these grooves 17 and the openings 15 into the space 13 and be discharged from there via the holes 14. The rigid plate 3' and the diaphragm 10 are arranged so they can be shifted one relative to the other in the direction of the vertical double-headed arrow 18, noting that conveniently the rigid plate 3' can be shifted by a means, now shown, whereas the diaphragm 10 is stationary. When the diaphragm 10 contacts the split 7, the seal 16 between the diaphragm 10 and the rigid plate 3' forms a closed cavity which is in connection with the means for generating a vacuum via the openings 15 and the space 13 as well as the hose 14.

It is possible to provide, in place of the openings 15, openings (not shown) in the frame 11 and below the diaphragm 10, which openings are connected at the outer side of the frame via a hose with the means for generating a vacuum. In this case, the grooves 17 arranged according to a grid pattern must then be extended to that marginal area of the diaphragm 10 which does not contact the split 7.

In the embodiment according to FIG. 6, the rigid plate 3', the rigid supporting member 4 and the flexible supporting member 5 of silicone rubber are designed in the same manner as in the embodiment according to the FIGS. 4 and 5. The supportng member 5 of silicone rubber again supports the dressing 6 and the split 7. In this embodiment, the table 1' supporting the rigid heated plate 3' is provided with an interior cavity 19 connected with the means for generating a vacuum via a hose connection 20. Openings 8 within the rigid heated plate 3', on the one hand, and further openings 21 arranged outside of the rigid heated plate 3', on the other hand, open into this cavity 19.

With this embodiment, the diaphragm 10 is formed of one single piece and again is clamped into a frame 11. On the bottom side of the diaphragm there are provided—in place of the grooves 17 arranged according to the pattern of a grid—depressions 22 extending up to the frame 11. Also with this embodiment a pressure-elastic seal 16, preferably of silicone rubber, is provided.

The heated rigid plate 3' can again be moved relative to the diaphragm 10 and its frame 11 in direction of the double-headed arrow 18, noting that it is convenient to lower in this case the frame 11 until the seal 16 contacts the upper side of the table 1'. Subsequently a vacuum is applied via the conduit 20 and propagates—with the frame 11 being lowered—into the cavity enclosed by the table plate and the diaphragm 10. The diaphragm 10 is thus drawn downward and pressed onto the split 7. In this case the pressure acting on the split 7 becomes effective first in the center area and then outwardly thereof, because when applying a vacuum the center portion of the diaphragm 10 is sucked downward first and it is only then that, starting from this center portion, the outer areas of the diaphragm are pressed against the split 7. This is of advantage because bubbles and gas inclusions formed in the dressing and in the bonding area between the dressing and the split are expelled.

At the upper side of the frame there can again be provided a cover lid 12 forming a cavity 25 above the diaphragm 10. A pressurized fluid, for example compressed air, can be supplied into this cavity 25 via a conduit 26 which provides the possibility of still further increasing the pressure acting on the split 7 with interposition of the diaphragm 10.

With all embodiments it is possible to omit the rigid supporting member 4.

The surface of the dressing 6 which is visible to the eye can be provided with a finish. This finish can, for example, be formed by spraying onto the supporting member 5 consisting of silicone, prior to applying the first aqueous dispersion, a polymer solution, in particular a solution of a polyurethane polymer, having a softening point which is lower than the softening point of the layer formed of the first aqueous dispersion of synthetic plastics material. The finish conveniently consists of a cross-linked polyurethane having a softening point of less than 80° C. If the dressed substrate is used as a material for producing shoe uppers, to which shoe soles of synthetic plastics material are applied by an injection molding process, for example shoe soles of polyurethane are applied by a foaming operation, it is in this case not necessary to apply an adhesive to the shoe upper prior to applying the sole by an injection moulding process or a foaming process because the thermal properties of the finish can be made use of and the finish then acts like an adhesive.

The dressed split leather 34 is shown in FIG. 7. This split has at its side 35 facing off the side provided with the dressing a structure formed by the channel-like depressions 17 or, respectively, of the depressions provided on the diaphragm 10 of the vacuum device or the like. The fibers or the like 36 protruding from the opposite surface of the split 34 are anchored within a layer 37 being formed of the second applied dispersion 6" of synthetic plastics material. This layer may comprise hollow microspheres 38 which impart a foam structure to this layer. The layer 37 has a thickness between 0.07 and 0.22 mm and is not or not pronouncedly thermoplastic, i.e. cross-linked from a low to a moderate degree.

The layer 37 formed of the second applied dispersion 6" of synthetic plastics material is inseparably connected with a layer 39 of the first applied synthetic plastics material 6'. Conveniently, hollow microspheres 38 are also embedded within this layer 39.

The layer 39 forming the sight surface or visible surface of the dressed split has a structure corresponding to the surface of the supporting member 5, i.e. and for example the grainy structure of leather or a structure corresponding to a velour leather.

The layer 39 can be provided with a finish 40 which equally has a corresponding structure if the finish is formed by spraying a polymer solution onto the structural surface of the supporting member 5. The finish 40 has preferably a thickness of less than 0.1 mm and conveniently consists of polyurethane or at least contains polyurethane.

EXAMPLE 1

A 18% solution of a polymer consisting of polyurethane and nitrocellulose is sprayed onto a base member 5 of silicone rubber, the base member having on its surface the negative impression of a leather structure. The polymer solution is subsequent to spraying dried in a heating channel by means of forced air, so that a film is formed weighing approximately 25 g/m². Subsequently, an approximately 50% dispersion based on butadiene is applied film by pouring in a thickness of approximately 0.2 mm. Also this layer is dried in a heating tunnel by means of forced air. The dispersion contains approximately 8% by volume of hollow microspheres having a shell of a polyvinylidene chloride copolymer and further contains approximately 3% of a cross-linking composition consisting of sulfur and a zinc compound and additionally contains approximately 4 parts of carbon black as a pigment. After solidification of this dispersion. a further layer is applied by pouring a dispersion of the same composition, the further layer having a thickness of approximately 0.15 mm. Immediately thereafter a split is put on the still wet dispersion and pressed onto the dispersion such that after the pressing operation approximately 15 g of the dispersion are squeezed out at the end portions, as seen in transport direction. Subsequently, the split provided with the coating is treated in a vacuum device, the heated plate of which has a temperature of approximately 90° C.

EXAMPLE 2

A polymer solution containing polyurethane and approximately 15% solid material in total is sprayed in an amount of about 150 g/m² onto a base member 5 of silicone rubber and having a textured surface and is dried to a film. Subsequently, an aqueous dispersion consisting of 40% polybutadiene, of 40% polyacrylate and of 20% polyurethane is applied at 200 g/m² by spraying onto the film obtained by drying the polymer solution. The dispersion contains 3%, based on the total weight, of polyvinylidene chloride particles containing an inflating agent. The content of this mixed dispersion in solid matter is approximately 55%. The layer of applied dispersion is subsequently placed, together with the structural support member 5, onto a conveyor belt 29 and passed by means of this conveyor belt through a high frequency field at a speed of 3 m/min. The high frequency field is generated by means of a 12 kW-generator. The support member 5 of silicone rubber having a thickness of approximately 2 mm and showing a structural surface is at most scarcely heated, as is the layer formed of the polymer solution, however, the layer formed from the dispersion is heated to approximately 100° C. because of of the dielectric polyacrylate and the water present in it. The layer formed from the dispersion is thus dried and hollow microspheres are simultaneously formed from the compact particles. The dried layer has a thickness of approximately 0.22 mm. If no compact particles are used, the thickness of the layer of applied dispersion would be 0.2 mm in wet condition, which thickness would be reduced down to approximately 0.11 mm in a dry condition.

A 50% polybutadiene dispersion containing about 8% by volume of hollow microspheres is applied to the solidified layer of dispersion at approximately 150 g/m². Subsequently, the split is placed onto this still wet layer of dispersion. This is followed by a further treatment in the roller press and thereafter, together with the support member 5, in the vacuum device, the metal plate 3 of which has a temperature of 115° C. After approximately 50 s, the finished dressed split can be removed from the vacuum device and taken from the support member 5.

EXAMPLE 3

In the manner described in Example 1, a polymer solution is first applied to a support member 5 of silicone rubber having a textured surface, whereupon a dispersion of synthetic plastics material is applied to the solidified polymer solution. In place of the split, an elastic fabric having elastomeric fibers of polyurethane extending in longitudinal direction is placed on the layer applied as the last layer in a wet condition. The fabric is, prior to being placed on the wet layer, extended or elongated in its longitudinal direction by 80% and clamped in this elongated condition within a very flat frame of synthetic plastics material. After the woven fabric clamped in the frame is applied, further treatment is effected within the vacuum device. After completion of further treatment in the vacuum device, the elastic dressed woven fabric is, together with the frame that is somewhat larger than the support member 5, taken from this support member, whereupon the fabric is taken out of the frame. The dressed fabric nearly completely reassumes its original length longitudinally. This is possible because the dressing can be crushed into itself and is soft. The thus dressed material can be elastically elongated as frequently as desired and always returns to its original shape.

What we claim is:

1. A dressed leather comprising:
   a split leather having one side from which fibers protrude;
   a first layer of a solidified aqueous dispersion having a thickness between 0.07 mm and 0.22 mm of a synthetic plastics material in which the fibers are completely immersed on the one side, the split leather being substantially free of the dispersion except at the fibers;
   a second layer of a synthetic plastics material of generally the same thickness as the first layer bonded to the first layer and having turned away therefrom a textured surface; and
   a finish layer overlying the textured surface of the second layer.

2. The dressed leather defined in claim 1 wherein the finish layer is a solidified polymer solution.

3. The dressed leather defined in claim 1 wherein the finish layer is a solidified polyurethane polymer solution.

4. The dressed leather defined in claim 1 wherein the textured surface is a grain structure.

5. The dressed leather defined in claim 1 wherein the textured surface is a velour structure.

6. The dressed leather defined in claim 1 wherein at least one of the dispersions includes polyurethane.

7. The dressed leather defined in claim 1 wherein at least one of the dispersions includes polybutadiene.

8. The dressed leather defined in claim 1 wherein at least one of the dispersions includes polyacrylate.

9. The dressed leather defined in claim 1 wherein at least one of the dispersions includes polyacrylonitrile.

10. The dressed leather defined in claim 1 wherein at least one of the dispersions includes a vinylacetate-ethylene copolymer or an ethylene-vinylacetate copolymer.

11. The dressed leather defined in claim 1 wherein wherein at least one of the layers has a foam structure.

12. The dressed leather defined in claim 1 wherein at least one of the layers contains more than 8% by weight of hollow microspheres containing a gas and having shells formed of a vinylidene chloride copolymer.

13. A dressed leather comprising:
    a split leather having one side from which fibers protrude;
    a first layer of a solidified aqueous dispersion of a synthetic plastics material in which the fibers are completely immersed on the one side, the split leather being substantially free of the dispersion except at the fibers;
    a second layer of a synthetic plastics material of generally the same thickness as the first layer bonded to the first layer and having turned away therefrom a textured surface; and
    a finish layer overlying the textured surface of the second layer.

* * * * *

UNITED STATES PATENT AND TRADEMARK OFFICE
CERTIFICATE OF CORRECTION

PATENT NO. : 4,581,261

DATED : April 8, 1986

INVENTOR(S) : Helmut SCHAEFER, Mercogliano, Italy, Philipp SCHAEFER Hannover, Fed.Re.of.Germany It is certified that error appears in the above-identified patent and that said Letters Patent is hereby corrected as shown below:

Page 1, left column, for the name of the assignee read:
-- MICROPLASTIC CORP., Bella Vista, Panama, part interest --

Signed and Sealed this

Twenty-eighth Day of June, 1988

Attest:

DONALD J. QUIGG

Attesting Officer

Commissioner of Patents and Trademarks